Aug. 1, 1967    S. N. ROSCOE    3,333,565
DISPLAY SYSTEM

Filed Aug. 27, 1964    7 Sheets-Sheet 1

INVENTOR.
STANLEY N. ROSCOE,
BY
Walter J. Adam
ATTORNEY.

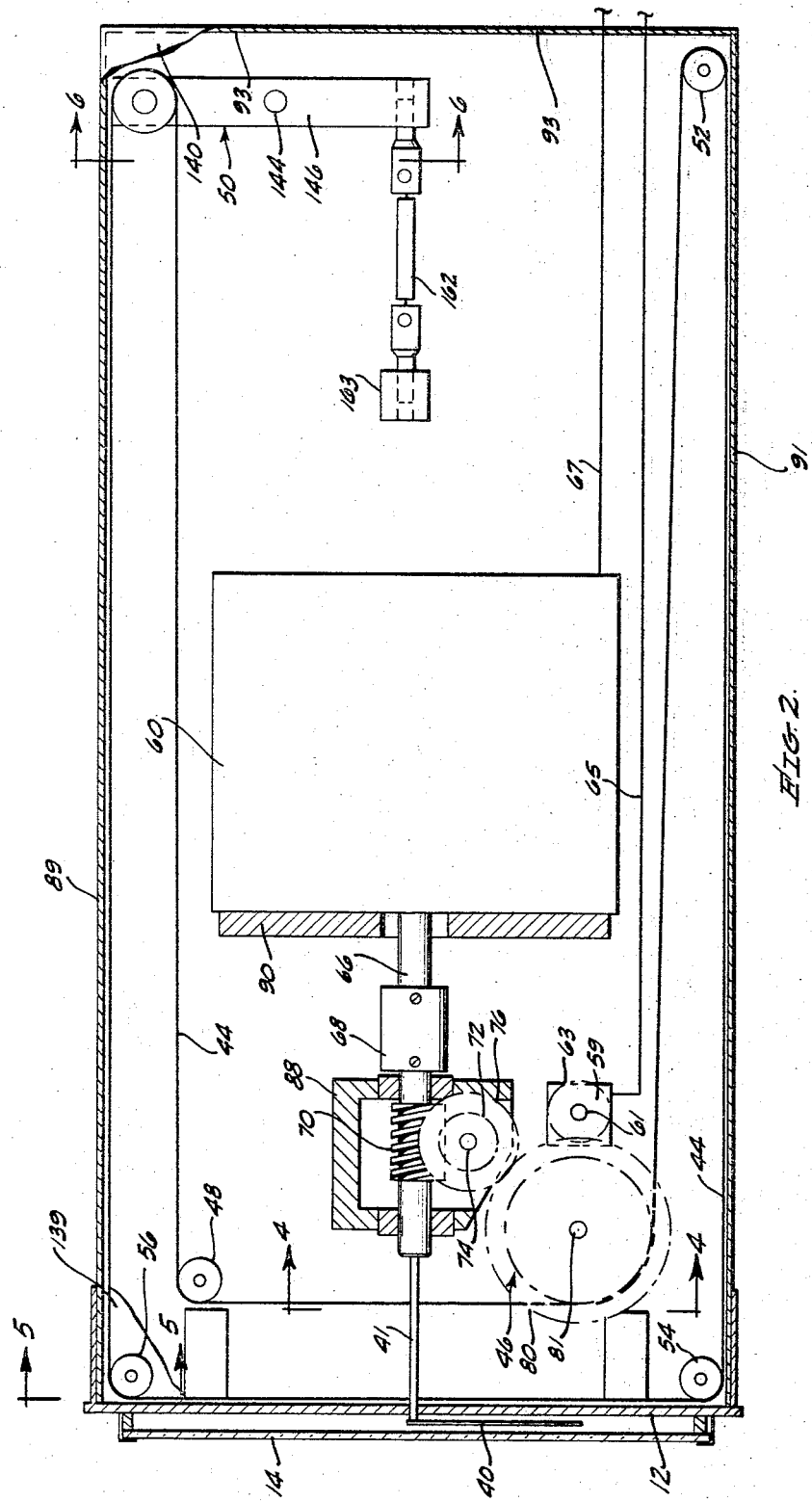

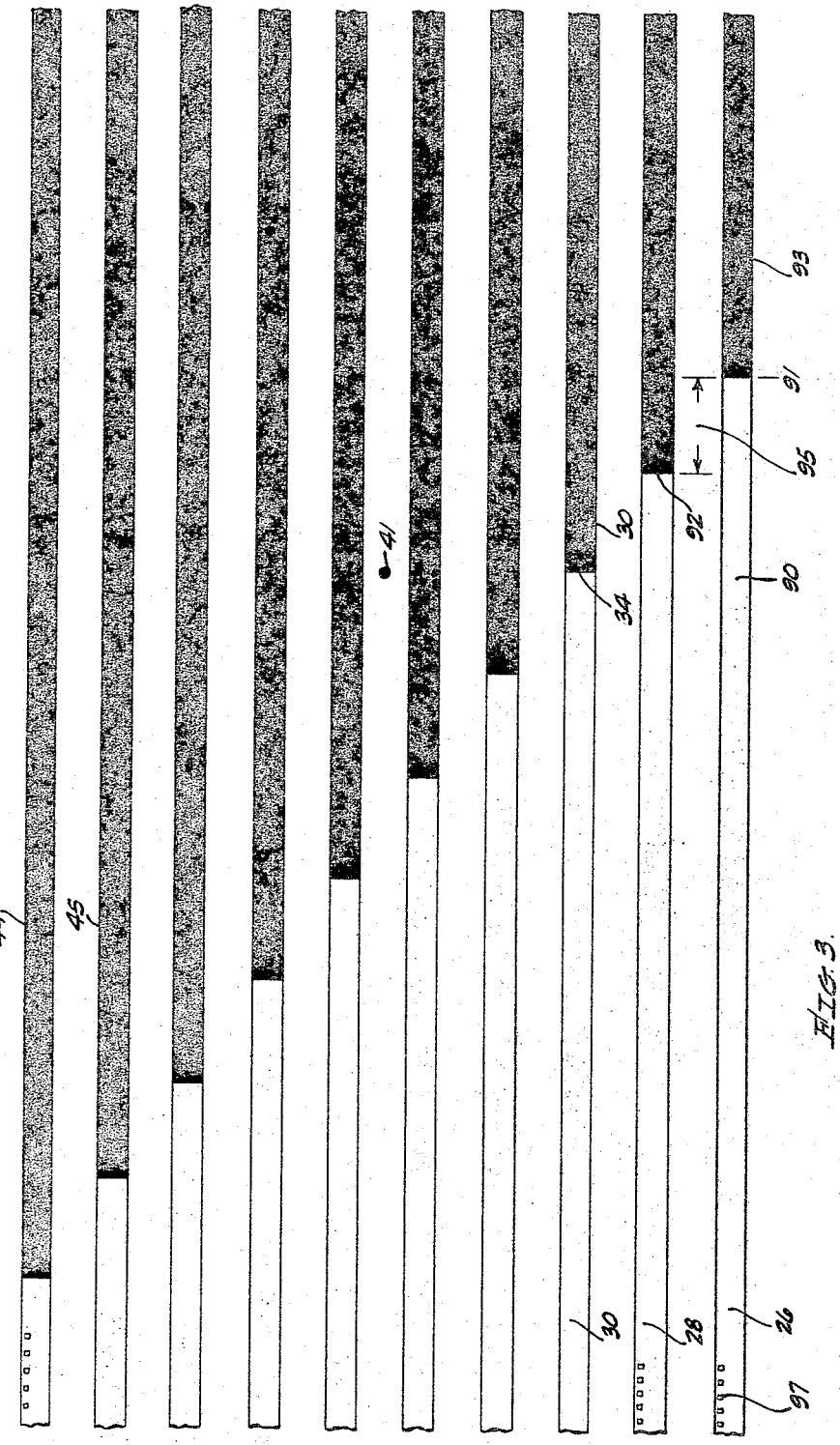

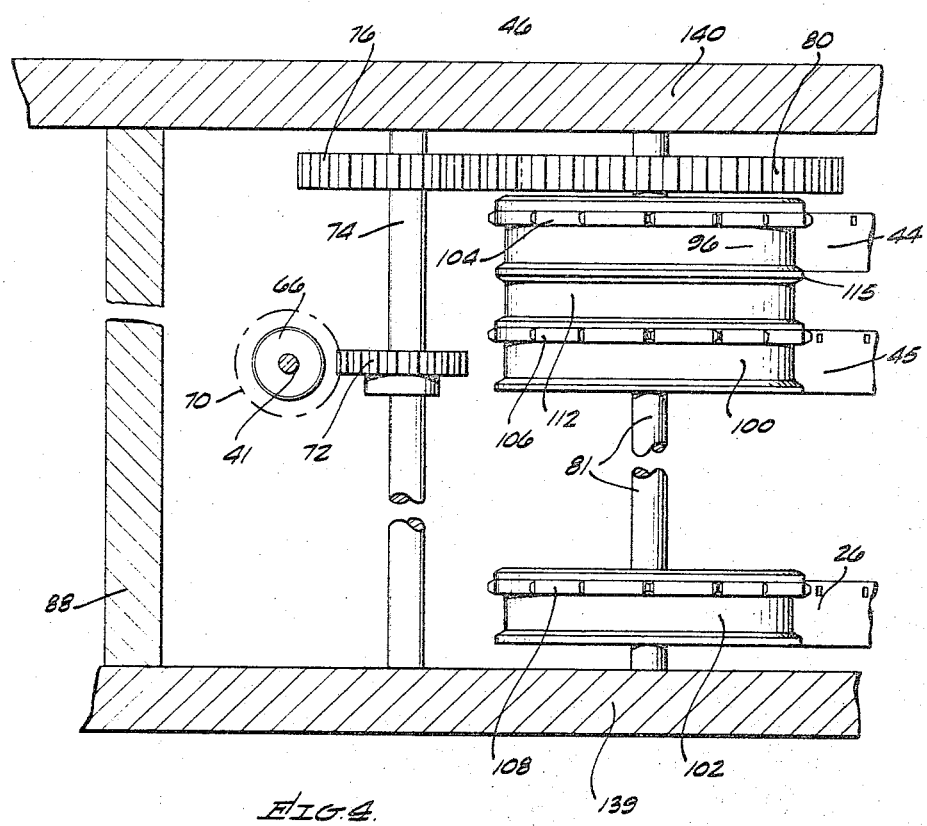

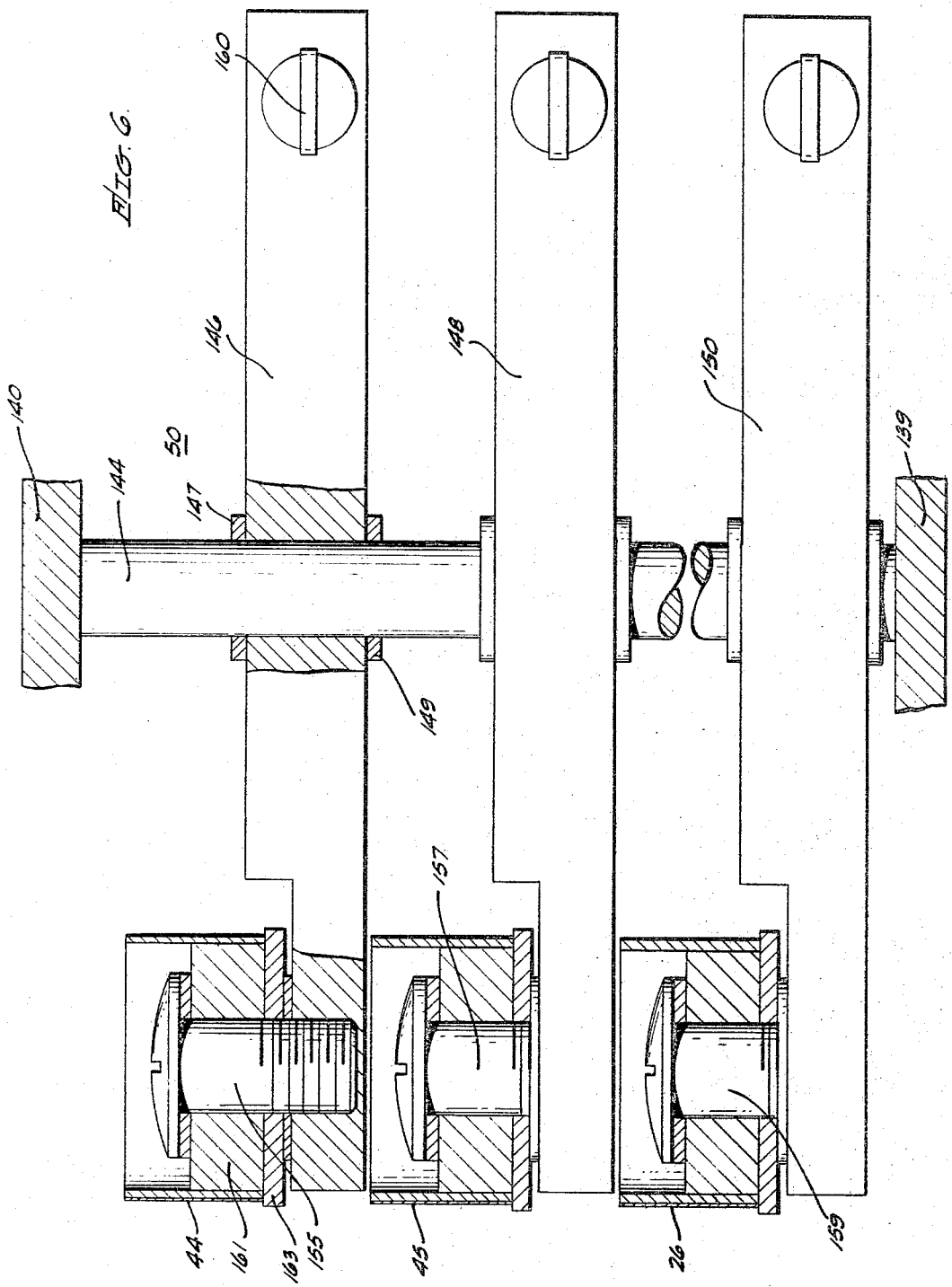

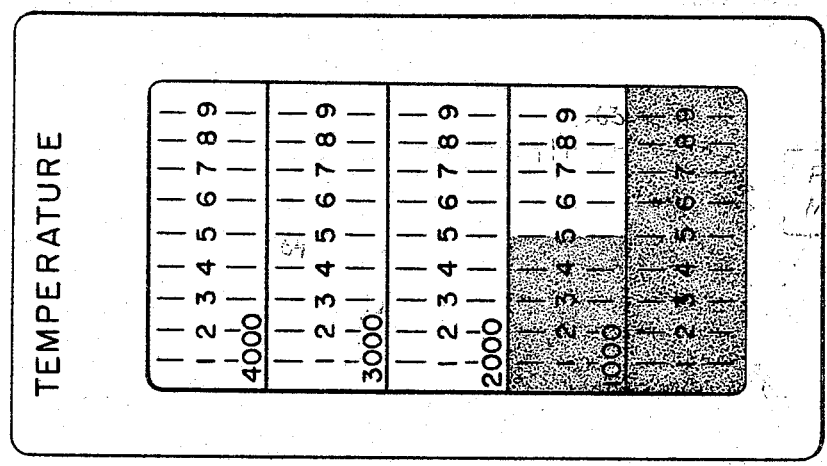
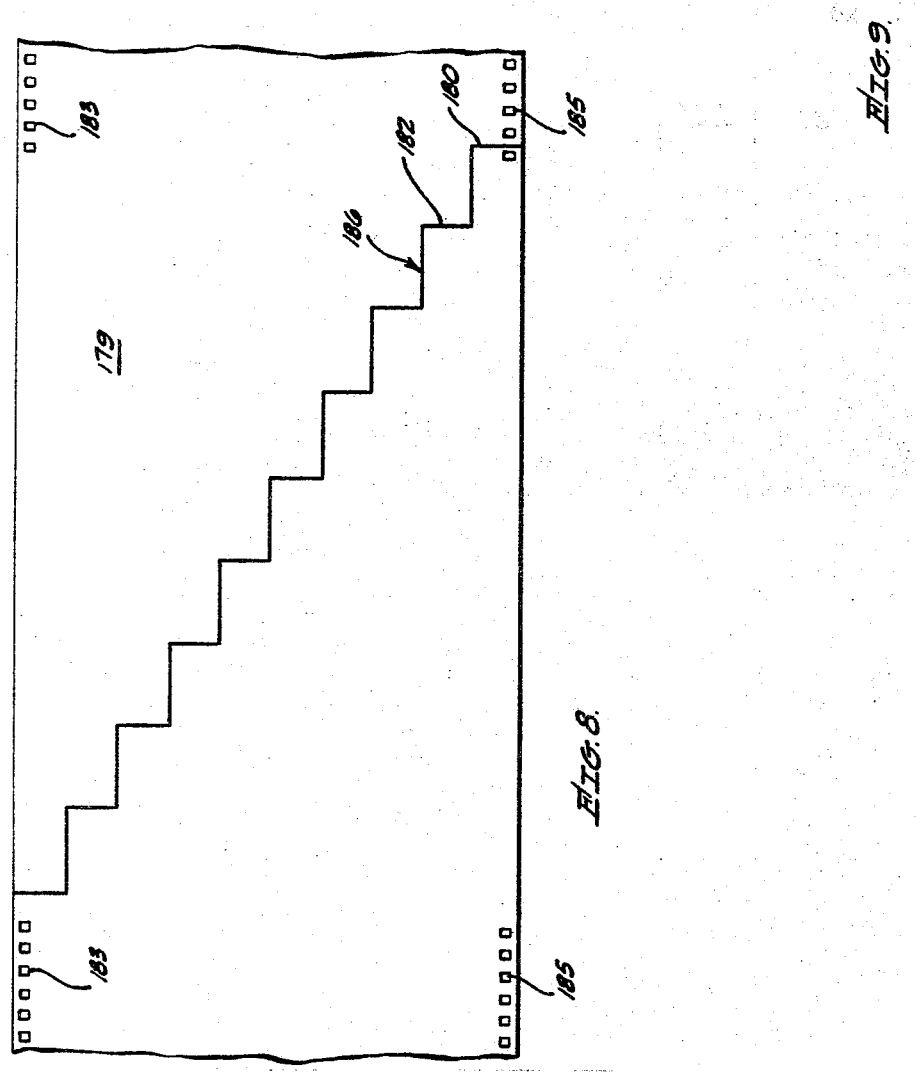

United States Patent Office 3,333,565
Patented Aug. 1, 1967

3,333,565
DISPLAY SYSTEM
Stanley N. Roscoe, Los Angeles, Calif., assignor to Hughes Aircraft Company, Culver City, Calif., a corporation of Delaware
Filed Aug. 27, 1964, Ser. No. 392,555
5 Claims. (Cl. 116—135)

This invention relates to informational displays and particularly to display systems utilizing an area-scale principle to reliably and rapidly indicate informational values to an observer.

A general display problem arises whenever a long scale must be read and controlled with a high degree of accuracy or when many bits of information must be conveyed at a relatively high rate. Conventional efforts to meet these requirements while maintaining a reasonable display size have typically resulted in a display in which the indicated values are often difficult to accurately and rapidly interpret. The solution of simply increasing display size to achieve the required scale length and resolution is generally impractical because of space requirements and because of the limitations of an observer's field of view.

The problem of reading a long scale arises when displaying any of a plurality of parameters such as temperature, pressure or altitude. Aircraft altimeters, for example, which require a long scale of values to be read and controlled with a high degree of accuracy throughout the entire scale, conventionally utilize displays having multiple pointers around a ten unit dial, having a drum displaying numbers at a window or having a combination of a counter and a single pointer. The three pointer display leads to frequent gross errors in reading of 1,000 feet or 10,000 feet values each represented by a separate pointer, particularly when the actual altitude is just below an even 1,000 feet or an even 10,000 feet. Also, the three pointer altimeter as well as other conventional display schemes have the disadvantage of requiring a relatively long time for reading of a value. Further, there is no convenient arrangement for displaying command altitude in direct relationship with the pointers, drum or counters.

Another requirement for a desirable display is that the full range of possible displayed values is visible all of the time in contrast to a moving scale or a drum behind a window in which only a portion of the scale is visible at any one time. This visibility of the scale allows the operator to rapidly determine the value from previously learned positional information. Also, in order to be compatible with population stereotypes for reading displays such as flight displays, the display element that moves should represent the thing being controlled and the direction of motion should correspond to that of the thing being controlled. For example, temperature or altitude should generally move in an upward direction for increasing values.

It is therefore an object of this invention to provide an improved and simplified display system particularly applicable to the display of many bits of information at a high rate.

It is another object of this invention to provide an accurate and reliable display system for displaying a relatively long scale of values and an index in a relatively compact space.

It is still another object of this invention to provide a display system in which both a long scale of values and the index may be continuously displayed to the observer.

It is a further object of this invention to provide a display system in which the direction of motion of the moving index element may generally correspond to that of the parameter being controlled.

It is a still further object of this invention to provide a parameter display system in which other information or selected values such as command values or limits may be readily indicated in direct relation to the position of the displayed parameter.

Briefly the display system utilizing an area-scale principle in accordance with the principles of the invention, presents multiple scale segments over the area of the display to create an effective scale length equal to a selected multiple of the linear dimension of the display. The scale may extend in parallel linear segments from one end of the display area to the other with each parallel segment representing an increasing increment of magnitude such as an additional ten thousand feet in an altimeter display, for example. Multiple index bar segments each having an index edge are provided by a moving tape arrangement in which the index bar segments are formed in a step function between adjacent parallel scale segments so that as one index bar is totally displayed the next bar becomes visible. Because the scale is fixed and visible, the position of the index edge of the last displayed index bar segment provides an easily determined indication of the value to be read.

The novel features of this invention as well as the invention itself, both as to its organization and method of operation, will best be understood from the accompanying description, taken in connection with the accompanying drawings, in which like characters refer to like parts, and in which:

FIG. 2 is a sectional view taken at line 2—2 of FIG. 1 for explaining the arrangement of the display tapes or belts;

FIG. 3 is a plan view of the continuous tapes shown in the sectional view of FIG. 2 except broken and flattened out for explaining the step function provided by the index edges of the index bar segment;

FIG. 4 is a partially broken away sectional view taken at line 4—4 of FIG. 2 for explaining the operation of the sprocket driving arrangement for moving the tapes;

FIG. 6 is a sectional view taken at line 6—6 of FIG. 2 for explaining the arrangement of the tension rollers that may be utilized for maintaining the tapes under a desired tension;

FIG. 8 is a plan view of a single movable tape broken and flattened out to illustrate an arrangement that may be utilized in accordance with the principles of the invention instead of a plurality of movable tapes; and FIG. 9 is a front view of a temperature display surface in accordance with the principles of the invention.

Figure 1:
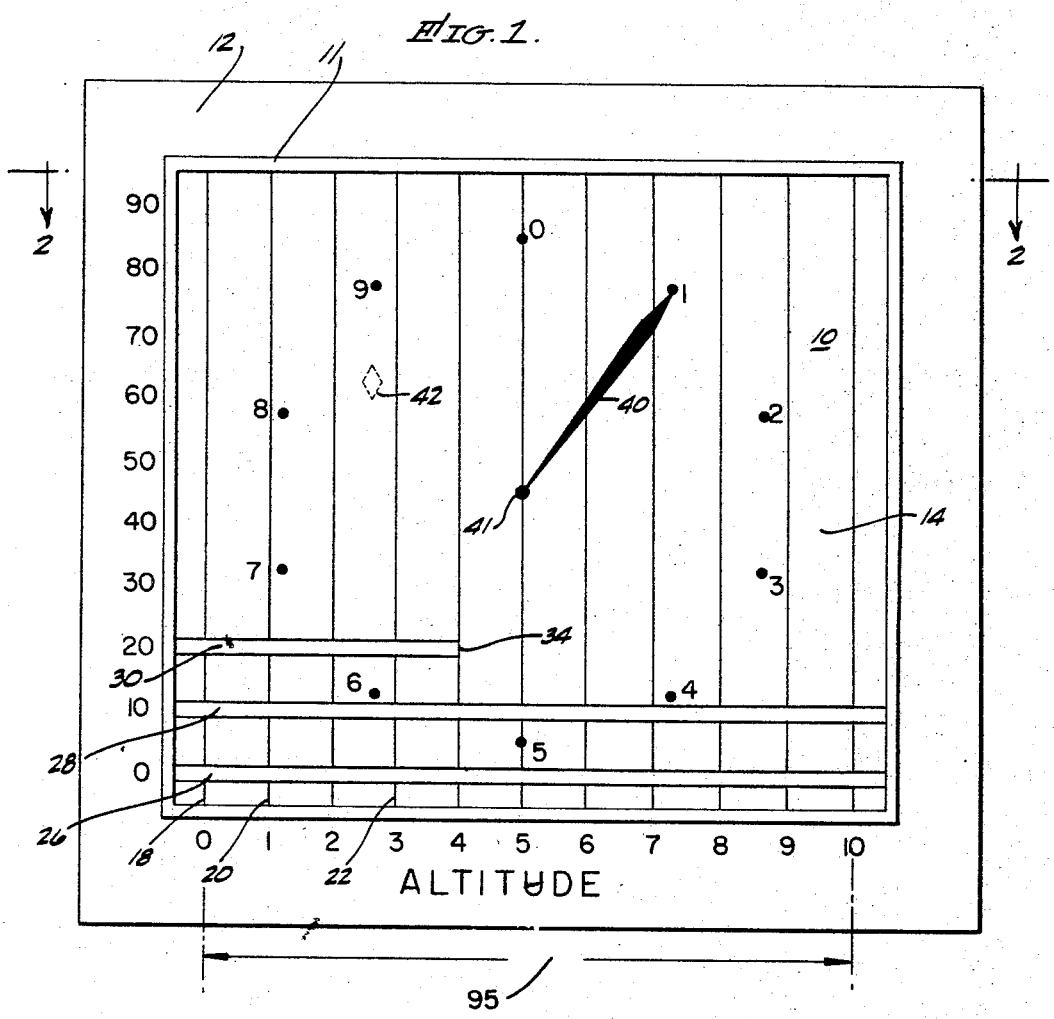
FIG. 1 is a front view of an area-scale altimeter display system in accordance with the principles of the invention showing the display indications provided thereby.

Referring first to the front view of the altimeter display system in accordance with the principles of the invention, a display surface or area 10 is defined by a mask 12 with a glass sheet 14 positioned adjacent thereto. The altitude scale is shown along the vertical dimension on the edge of the mask 12 by numbers 0, 10, 20 . . . 90 each representing an altitude of 0, 10,000, 20,000 . . . 90,000 feet. The numbers may be inscribed in white, for example, on the mask 12 external to the glass 14 which glass sheet may be mounted on the mask 12 by a suitable flange 11. White vertical lines such as 18, 20, 22 and 24 are etched on the glass 14 to indicate portions of the horizontal scale and may each represent 1,000 feet in altitude. Horizontal multiple index bar segments such as 26, 28 and 30 together represent the altitude value at an index edge or index 34. The bar segments 26 and 28, which are white, for example, may extend across the entire surface in the horizontal direction, respectively indicating that the altitude is greater than 10,000 and 20,000 feet. The index edge 34 indicates that the altitude is approximately 24,000 feet. Thus, as the value of each scale segment is completely indicated by the index bar segment, an index bar segment with its index edge appears on the adjacent position or at the adjacent scale segment to provide a continuous indication that moves from left to right and upward in bar segments. It is to be noted that the edge 34 moves to both lower and higher values and when the altitude indication is decreasing the upper bar segment becomes black, for example, as the edge 34 of the white bar appears at the right of the next lower level, which is at the maximum value of the 10,000 feet scale increment represented by a single scale segment.

For reading of the displayed parameter in hundreds of feet between 24,000 and 25,000 feet, for example, a pointer 40 is provided rotating around a center shaft 41 at the surface area 10 and having a circular scale designated 0, 1, 2, 3 . . . 9 each representing 100 feet of altitude. With the pointer 40 at the 100 feet mark, the total altitude reading shown in FIG. 1 is 24,100 feet. It is to be noted that the pointer 40 which indicates the lowest increment of the total scale may be utilized only when a highly accurate value is desired. An altitude indicator 42 which may be formed by a symbol positioned on the glass 14 or by other conventional arrangements, provides an indication in direct scale relation with the moving indication. Thus the display system of FIG. 1 displays a scale of 100,000 feet altitude in an area of three inches by three inches or five inches by five inches, for example, by utilizing the multiple scale segment arrangement in accordance with the principles of the invention.

Figure 2A:
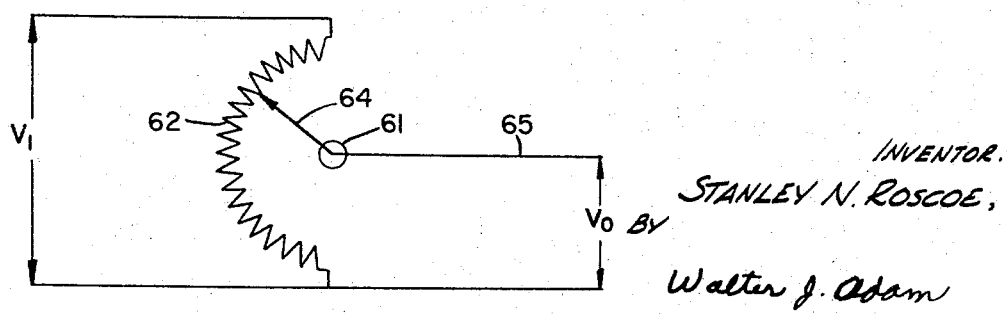
FIG. 2a is an electrical schematic of the synchro circuit of FIG. 2.

Referring now to the sectional view of FIG. 2, the arrangement of the tapes, tape control and display surface will be explained in further detail. A tape 44 which may be a continuous tape provides the index bar segment at one scale segment or at a level such as the 90,000 feet level. The tape 44 may have a continuous path around a driver assembly 46, a roller assembly 48, a tension roller assembly 50 and roller assemblies 52, 54 and 56. The pointer 40 is shown in position between the mask 12 and the glass sheet 14. The tapes such as 44 are simultaneously moved in response to a servo motor 60 which may be a conventional bidirectional servo motor having a series field winding and responding to a control signal applied to the field or to the rotor. The servo motor 60 may be any conventional type such as shown on page 276 of the book, "Servomechanism Practice," by W. R. Ahrendt and C. J. Savant, Jr., Second Edition, McGraw-Hill Book Co., New York, 1960. The motor 60 may operate in a closed loop servo arrangement to provide a null condition with a sensed signal and signals representative of a measured altitude. For example, an altimeter (not shown) may provide, at a null determining bridge, a voltage signal representative of the position of a pressure sensing aneroid. A gear 59 which is meshed with the gear 80 and is operating on a shaft 61 may apply positional information to a pair of properly geared synchros or resolvers indicated by a box 63. The box 63 may include a potentiometer arrangement for developing a position indicating voltage such as shown on pages 44 and 45 of the above referenced "Servomechanism Practice" book. A schematic of such a circuit is shown in FIG. 2a wherein a fixed voltage $V_1$ is applied across a resistance element 62, and a slider 64, which is moved in accordance with the position of shaft 61, moves across the resistance element. Accordingly, the output $V_0$ of the circuit will be a voltage representative of the shaft position. The synchro circuit 63 applies feedback signals on a plurality of leads indicated as composite lead 65 to the external null determining circuit (not shown) where it is compared with the signal from the altimeter. A composite lead 67 supplies power and control signals to the motor 60. The motor thus may rotate until a null condition is developed. Voltage servo systems for controlling the position of a motor in response to a sensed value are well known in the art and will not be explained in further detail. Also it to be noted that the closed loop servo system may be formed of mechanical arrangements as are well known in the art. The servo motor 60 applies the rotational motion through a shaft 66, including a suitable flexible coupler 68, to a driver gear 70 which may be a standard worm driver. A worm gear 72 driven by the worm 70 applies rotational motion through a shaft 74 to a gear 76 which is meshed with a gear 80 of the driver assembly 46. The shaft 66 extends beyond the worm driver 70 and is concentrically attached to the pointer shaft 41 and the pointer 40. Thus, the motor 60 may be selected to provide 360 degrees of rotation for every 1,000 feet of altitude and the gear ratios controlling the driver assembly 46 selected so that an index edge such as 34 (FIG. 1) moves the width of the display area for 10,000 feet of altitude change.

The elements such as the shafts may be mounted between a bottom plate 139 and a top plate 140 which are attached to side plates 89 and 91 and an end plate 93. A broken portion of the plate 139 is shown for clarity of illustration and the plate 140 is shown dotted to indicate that it is above the section line. The worm 70 is supported by a suitable structure 88 and the motor 60 by a suitable structure 90 which may be attached to the plates 139 and 140. Each of the shafts 74 and 81, the shafts passing through the roller assemblies 48, 52, 54 and 56 and the shaft in the tension roller assembly 50 may be supported by the plates 139 and 140. The shaft 61 of the gear 59 may be suitably supported by the plate 140. The tension assembly 50 which operates on a common shaft 144 utilizes a bar or arm such as 146 for individually controlling the tension of each tape such as 44. A spring 162 is provided for each bar such as 146 and connected between the bar and a mounting structure 163 in turn mounted between the plates 139 and 140.

Referring now to FIG. 3, the tapes such as 26, 28, 30, 44 and 45 are shown broken and flattened out in their relative positions as maintained by the roller and driver structure of FIG. 2. It should be noted that the tapes shown in FIG. 3 have been greatly reduced in size as compared to those shown in FIG. 1 in order to illustrate the step function procedure. The tapes such as 26 have a portion 90 to the left of an edge position or index 91 which may be white in color and a portion 93 to the right which may be black in color. The tapes may be formed of any flexible material such as nylon impregnated fiberglass, plastic or stainless steel sheets. A distance 95 between adjacent edges such as 91 and 92 of adjacent tapes such as 26 and 28 is substantially equal to the width of the display surface 10 of FIG. 1. The index edge or edge of the white portion of each adjacent tape is offset in a step function so that as each level becomes all white or all black the index edge of the adjacent tape is displayed at the adjacent level. Each of the tapes such as 26 has sprocket holes such as 97 along one edge thereof. It is to be noted that the principles of the invention are not limited to utilizing of continuous tapes as arrangements may be provided of non-continuous tapes in accordance with the principles of the invention.

Referring now to FIG. 4 which shows a partial section taken at line 4—4 of FIG. 2, the driving assembly 46 will be explained in further detail. In response to rotation of the shaft 66 the worm gear 72 is driven to rotate the shaft 74 and the gear 76. The gear 80 rotates in response to the gear 76 to in turn rotate the driver shaft 81. Mounted fixedly on the shaft 81 are sprocket drives such as 96, 100 and 102 each having rings 104, 106 and 108 mounted thereon with properly spaced sprocket teeth around the circumference thereof for meshing with the sprocket holes on the tapes 79, 44 and 26. The sprocket drives such as 96, 100 and 102 are fixedly mounted to the shaft 81. Therefore, there can be no relative movement between the various sprocket drives. Spacing rollers such as 112 are positioned between adjacent sprocket drives such as 96 and 100 to maintain the desired vertical spacing of the scale segments of the display. To reduce friction, the tapes such as 44 contact a raised portion 115 at a side of the sprocket driver 96 opposite from the ring 104. The structure 88 as well as the shafts 74 and 81 are mounted to the plates 140 and 139. The shafts 74 and 81 are freely rotatable in the plates 140 and 139 by suitable bearing structures (not shown).

Figure 5:
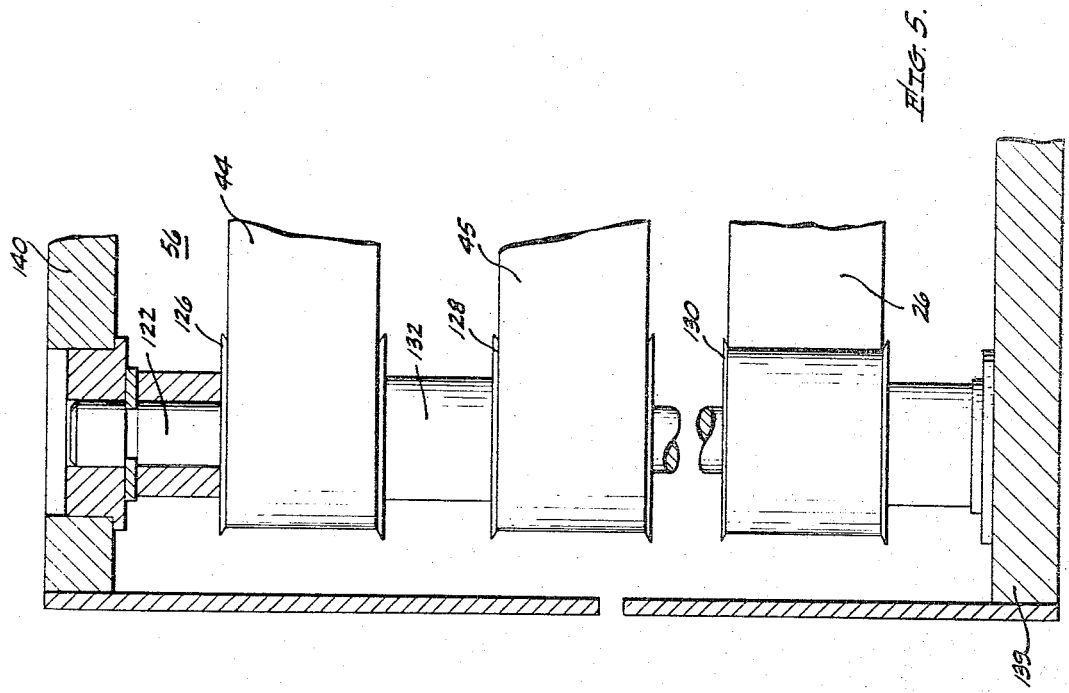
FIG. 5 is a sectional view taken at line 5—5 of FIG. 2 for explaining the arrangement of the rollers utilized to direct the moving tapes.

Referring now to FIG. 5, the arrangement of the roller assemblies such as 56 is shown with the tapes 44, 45 and 26 maintained in positions similar to that shown by the corresponding tapes of the driver assembly 46 of FIG. 4. Rollers such as 126, 128 and 130 are freely rotatable around the circumference of a shaft 122. Spacers such as 132 are provided between adjacent rollers such as 126 and 128. The shaft 122 may be mounted to the mounting plates 139 and 140 with suitable bearings as shown at the plate 140 so as to also be freely rotatable. Each of the other roller assemblies 48, 52 and 54 may be similar to the roller assembly 56.

Referring now to the elevational view of FIG. 6, the tension roller assembly 50 is shown with the tapes 44, 45 and 26 in the same relative vertical position established by the driver assembly 46 of FIG. 4. A shaft 144 mounted to the plates 139 and 140 acts as a pivot point to arms such as 146, 148 and 150 which individually rotate thereon. Rollers 154, 156 and 158 are rotatably mounted to vertical circular extensions 155, 157 and 159 of the respective arms 146, 148 and 150. The circular extensions 155, 157 and 159 may be bolts tapped into the respective arms 154, 156 and 158. Bearings such as 161 may be included in the rollers such as 154 mounted against washers 163. Rings such as 147 and 149 may be provided to maintain the arms such as 146 in position along the shaft 144. The tapes such as 44, 45 and 26 are thus positioned and move on the respective rollers 154, 156 and 158. The other ends of the arms such as 146 have mounting rings such as 160 to which tension springs such as 162 of FIG. 2 are attached.

Figure 7:
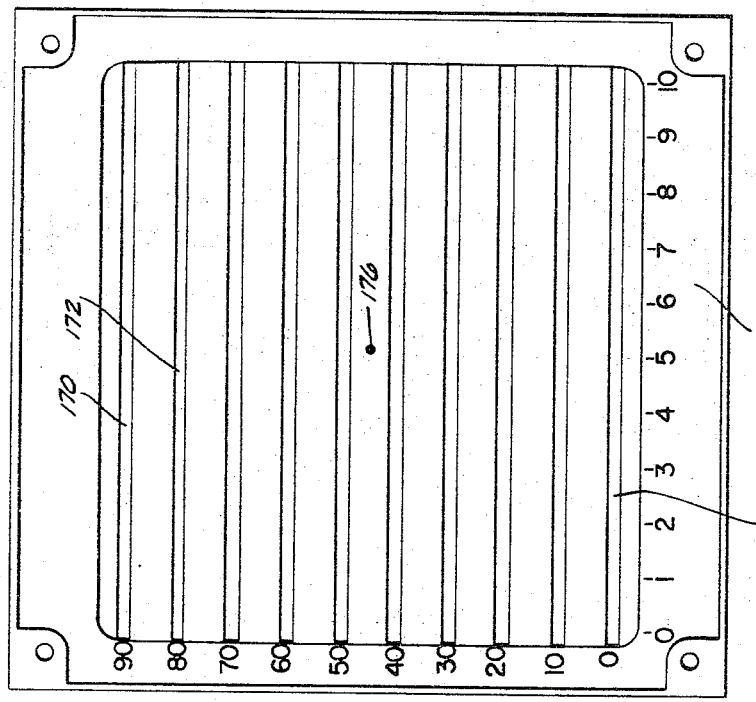
FIG. 7 is a sectional view taken at line 7—7 of FIG. 2 for explaining the mask that may be utilized to define the width and length of visibility of the index bars provided by the multiple tape segments.

Referring now to FIG. 7, the mask 12 includes ten horizontal openings or slots such as 170, 172 and 174 through which the tapes are observed when viewing the display. An opening 176 is provided in the mask 12 for the shaft 41 to extend and control the pointer 40. The vertical position of the slots such as 170, 172 and 174 are provided to correspond to the vertical positions of the tapes as shown in the view of FIG. 4. It is to be noted that if additional information is to be displayed, the slots of the mask 12 may be relatively wide, for example. The white numbers of the scale are shown etched on the surface of the mask 12.

Although the arrangement of FIGS. 1 and 2 has been described for displaying a single parameter, that is, altitude, the tapes may be separated sufficiently in a vertical direction such as along the shaft 81 of FIG. 4 so that an additional set of tapes may be utilized in accordance with the principles of the invention. The additional set of tapes may operate on rollers concentric with the rollers shown. A separate drive assembly (not shown) similar to the assembly 46 may be provided to respond to a separate servo motor (not shown). Thus parameters such as command altitude or altitude of other craft may be displayed simultaneously with the altitude indication of the area display system in accordance with the principles of the invention. It is to be noted that the system of the invention allows the additional parameters to be displayed in positions along the scale showing a direct relation to the position of altitude index.

Another arrangement in accordance with the principles of the invention may utilize a single tape 179 as shown in FIG. 8. Edges such as 180 and 182 are formed on the tape 179 to form a step function of a line 186 similar to that provided by the plurality of tapes of FIG. 3. The tape 179 may be white at the position left of the line 186 and black to the right thereof. Sprocket holes 183 and 185 may be provided along each edge of the tape 179. It is to be noted that selection of a single tape such as 179 may result in some difficulty in displaying additional information on the display surface. For a system utilizing the single tape, the driver assembly may, for example, have a sprocket wheel only at top and bottom thereof, and the roller assemblies may be arranged to provide constant support parallel to the axis of the shafts thereof.

Referring now to FIG. 9 which is a front view of an additional area-scale display in accordance with the invention, temperature is displayed at 100 degree increments from 0 to 5000 degrees. As a mask is not utilized to control the indication on this display, a single tape such as that shown in FIG. 8 except with only 5 step functions or index edges, is utilized behind a partially transparent dial surface on which the numbers are etched. The mechanism for moving the single tape may be similar to that explained relative to FIG. 2 except that a common roller is utilized for each roller assembly and a common driver arrangement may be utilized with sprocket holes at only the top and bottom of the tape. In the arrangement of FIG. 9 the index bar at any level is not visible beyond the indicated scale segments while in the display of FIG. 1 the visible index bars may extend slightly beyond the indicated scale segments. However, in both arrangements of the invention, the index position of one bar moves out of a first scale segment at the same time that the index position of the adjacent bar moves into a second scale segment.

It is to be noted that the principles of the invention are applicable to the display of many parameters other than altitude and temperature and that single or any desired number of tapes may be utilized depending upon the type and amount of information being displayed and upon the desired configuration of the moving display element.

Thus there has been described an area-scale display system that utilizes multiple scale segments to provide an effective scale length that is a plurality of times greater than any dimension of the display surface. The integrated scale allows rapid reading of many bits of information with a minimum of eye movement. The system allows many parameters to be displayed in proper positions relative to the scale segments. The moving portion of the display or the index moves in a selected direction relative to the scale which is completely visible at all times. Because the entire scale is continuously in full view, the position of the index relative to the total scale is easily determined. The display system in accordance with the invention provides accurate and rapid reading of values over a large scale without the difficulties and errors associated with conventional display systems.

What is claimed is:

1. A display system for indicating a selected value along a scale from a first end thereof comprising
   a substantially rectangular structure having an approximately flat display surface with first and second dimensions,
   a plurality of scale segments on said surface forming the scale and each having a length substantially equal to said first dimension and positioned substantially parallel to each other and adjacent to each other along said second dimension,
   tape holding roller means,
   a plurality of movable tapes each one supported by said roller means so as to be substantially parallel to said display surface adjacent to a different scale segment to move substantially parallel to said scale segments, each tape having a first and a second color therealong with an index position therebetween, said tapes positioned so that when the index position of a first tape moves outside of said surface, the index position of a second tape adjacent to the next scale segment of said scale in a direction along said scale away from said first end moves into said surface when the selected value moves along said scale from said first end, driving means contactable with said plurality of tapes for jointly moving said tapes on said roller means and along said surface, and bi-directional servo motor means coupled to said driving means for selectively controlling said driving means to move said tapes in a selected direction so that said first color is displayed adjacent to said plurality of scale segments between the index position at the selected value and said first end of said scale.

2. A display system for providing an indication along a scale having first and second ends comprising a display structure having an approximately flat surface with a selected area, a plurality of scale indication segments on said surface positioned substantially parallel and adjacent each other in said area, tape holding means, movable tape means supported by said tape holding means and positioned adjacent to said area to develop a plurality of index bar segments sequentially along said scale segments, each segment having an index edge movable along the corresponding scale segment, said index edges forming a step function so that when one index edge is moved along the entire length of the corresponding scale segment and past the edge of said selected area the index edge of the adjacent bar segment is displayed at an adjacent scale segment, and bi-directional servo motor means coupled to said tape holding means for moving said tape means selected distances along said area.

3. A display system comprising means forming a substantially flat display surface having a plurality of parallel and adjacent positions thereon, a plurality of scale segments on said surface each adjacent to a different one of said positions, said plurality of scale segments in combination forming a selected scale extending from a first to a second value, tape supporting means, a plurality of tapes mounted on said tape supporting means, each tape movable substantially parallel and adjacent to a different one of said scale segments, said tapes each having first and second portions therealong of respective first and second colors with an index edge therebetween, the index edges of adjacent tapes separated a distance substantially equal to the width of said surface in the direction of movement of said tapes to form a step function of index edges, and means coupled to said tape supporting means for jointly moving said plurality of tapes a selected distance in a selected direction along said surface, said first color extending along said positions from said first end of the scale to a selected value indicated by an index edge of one of said tapes.

4. A display system for indicating the value of a selected parameter comprising:

a substantially flat display surface with first and second dimensions, a plurality of linear scale segments on said display surface, each having a length substantially equal to said first dimension and positioned substantially parallel to each other and adjacent to each other along said second dimension, scale markers circularly positioned on said display surface, tape holding means, a plurality of movable tapes each one supported by said roller means so as to be substantially parallel to said display surface adjacent to a different scale segment to move substantially parallel to said scale segments, each tape having a first and a second color therealong with an index position therebetween, said tapes positioned so that when the index position of a first tape moves outside of said display surface at a first end thereof, the index position of a second tape adjacent to the next scale segment of said scale in a direction along said scale away from said first end moves into said surface when the selected value moves along said scale from said first end, circular scale indicator means having a center shaft rotatably mounted through said display surface at the center of a circle formed by said scale markers and having an indicator member coupled to said center shaft for displaying the least signicant value unit of said selected parameter, driving means contactable with said plurality of tapes for jointly moving said tapes on said roller means, and motor means coupled to said driving means and to said circular scale indicator means for selectively controlling said driving means and said indicator means to indicate the value of said selected parameter.

5. A display system for indicating the value of a plurality of parameters comprising:

a display surface with first and second dimensions, a plurality of linear scale segments on said display surface, each having a length substantially equal to said first dimension and positioned substantially parallel to each other and adjacent to each other along said second dimension, a plurality of tape holding roller means, a plurality of groups of movable tapes each tape supported by said roller means so as to be substantially parallel to said display surface adjacent to a different scale segment to move substantially parallel to said scale segments, each tape having a first and a second color therealong with an index position therebetween, said tapes positioned so that when the index position of a first tape of a group moves outside of said surface at a first end thereof, the index position of a second tape of that group adjacent to the next scale segment of said scale in a direction along said scale away from said first end moves into said surface when the selected value moves along said scale from said first end, a plurality of driving means each driving means contactable with the tapes of a particular group for jointly moving said tapes of that group on said roller means, and a plurality of motor means, each motor means coupled to a particular driving means for selectively controlling that driving means to move a particular group of tapes in a selected direction to indicate the value of the plurality of parameters.

References Cited
UNITED STATES PATENTS

| | | | |
|---|---|---|---|
| 1,258,031 | 3/1918 | MacGahan | 116—129 |
| 1,860,763 | 5/1932 | Adamiecki | 116—135 |
| 2,070,431 | 2/1937 | Hoppmann | 35—24.4 |
| 2,212,161 | 8/1940 | Kirton | 116—135 |
| 2,502,707 | 4/1950 | Correa | 35—24.4 |
| 2,600,816 | 6/1952 | Tuttle et al. | 40—96 |
| 2,939,421 | 6/1960 | Durnin | 116—135 |
| 3,027,768 | 4/1962 | Melchior | 73—384 |
| 3,099,511 | 7/1963 | Hickox | 346—17 |
| 3,182,631 | 5/1965 | Gomes | 116—115 |

LOUIS J. CAPOZI, *Primary Examiner.*